United States Patent [19]

Williams

[11] Patent Number: 4,862,353
[45] Date of Patent: Aug. 29, 1989

[54] MODULAR INPUT DEVICE SYSTEM

[75] Inventor: David L. Williams, Tualatin, Oreg.

[73] Assignee: Tektronix, Inc., Beaverton, Oreg.

[21] Appl. No.: 89,041

[22] Filed: Aug. 24, 1987

Related U.S. Application Data

[63] Continuation of Ser. No. 606,503, Mar. 5, 1984, abandoned.

[51] Int. Cl.⁴ .............................................. G06F 13/00
[52] U.S. Cl. .................................. 364/200; 364/708; 361/394
[58] Field of Search ............ 364/200, 708; 339/75 R, 339/75 M; 361/392-396; 73/431, 432 AD

[56] References Cited

U.S. PATENT DOCUMENTS

| | | | |
|---|---|---|---|
| 692,052 | 7/1901 | Forster | 312/111 |
| 1,602,383 | 10/1926 | Andersson | 312/111 |
| 4,228,483 | 10/1980 | Maury et al. | 361/393 |
| 4,276,594 | 6/1981 | Morley | 364/200 |
| 4,365,294 | 12/1982 | Stokken | 364/200 |
| 4,401,351 | 8/1983 | Record | 361/395 X |
| 4,459,655 | 7/1984 | Willemin | 364/200 X |
| 4,484,273 | 11/1984 | Stiffler et al. | 364/200 |
| 4,527,285 | 7/1985 | Kekas et al. | 361/393 X |
| 4,558,914 | 12/1985 | Prager et al. | 361/393 X |

OTHER PUBLICATIONS

Wyman J. N., "Cluster Configuration of Data Processing Device," IBM Technical Disclosure Bulletin Dec. 1980, p. 2951.

*Primary Examiner*—David L. Clark
*Attorney, Agent, or Firm*—Patrick W. Hughey; Robert S. Hulse

[57] ABSTRACT

A computer terminal work station having multiple peripheral units simultaneously interconnected into the terminal. A micro processor controller is provided in the terminal and a micro processor slave is provided in each of the peripheral units. Each unit is provided with a bus segment and means to interconnect the bus segments to each other. A single cable extends from the terminal to one of the peripheral units to be connected to the bus segment of that unit, and thereby to the bus segments of all the interconnected units. The units are selectively mechanically interlocked as desired.

5 Claims, 3 Drawing Sheets

MODULAR INPUT DEVICE SYSTEM

This is a continuation of application Ser. No. 606,503 filed May 3, 1984, now abandoned.

FIELD OF INVENTION

This invention relates to computer terminals and more particularly to computer terminals having a multiple of input devices that are simultaneously connected to the terminal.

BACKGROUND OF INVENTION

A computer terminal is the basic unit that links the user or operator to a central processing unit or computer. Thus the user "communicates" to the computer through the terminal. The user inputs that communication to the terminal through a variety of peripheral units that, among others, includes "key boards", "key pads", "joy sticks" and "tablets". The "language" used by each of these peripheral units is unique to that unit and thus the terminal must have the capability of translating each of the peripheral languages into the computer's language for conveyance to the computer.

Prior terminals are designed to accommodate specific ones of the peripheral units. For example, a terminal designed to accommodate the four peripheral units referred to above will have a specific outlet for connection with each of the units and internal circuitry that translates that unit's language to the base computer language.

The problem with the above described basic terminal design is that it creates a very cumbersome work station for an operator who needs several of the peripheral units hooked up and operating at the same time. An interconnecting cable runs from each of the peripheral units to the specific outlet or receptacle for that unit. The operator will locate the unit at a position where he can conveniently use it. Thus the units tend to be scattered around the work station with the cables running every which way, crossing over, under, and around other cables in its path from the selected location of the unit to the terminal.

BRIEF DESCRIPTION OF INVENTION

The present invention provides a unique solution by providing a micro processor controller in the terminal unit and a micro processor slave in each of the peripheral units. The controller is programed to interface with all of the microprocessor slaves and can thus be interconnected through a single outlet to any one of the peripheral units.

Rather than having an interconnecting cable running from each unit to the terminal, the present system provides a single cable running from the terminal to only one of the units. Each unit is provided with a bus segment that is interconnected with the micro processor slave of that unit and includes four external outlets or receptacles (e.g. two at the top edge and one of each of the side edges). The cable is connected to a top edge outlet of that unit.

A second unit is connected through one of its side edge receptacles directly to a side edge receptacle or outlet of the first unit thereby interconnecting the two bus segments. The micro processor slave of the second unit is thus connected to the bus segment of the first unit and through it to the cable and then to the terminal. The micro processor slaves are controlled to communicate with the terminal sequentially.

Any of the units can be directly connected to the terminal, andother of the units can be organized as desired on one side or the other of the directly connected unit, with another unit connected to its other side outlet etc. The units can be mechanically interlocked to effectively create a single multi purpose peripheral panel board rather than the multiple of scattered units of the prior systems.

DETAILED DESCRIPTION AND DRAWINGS

Having thus briefly described a preferred embodiment of the invention, the following detailed description is provided with reference to the drawings wherein.

Figure 1:
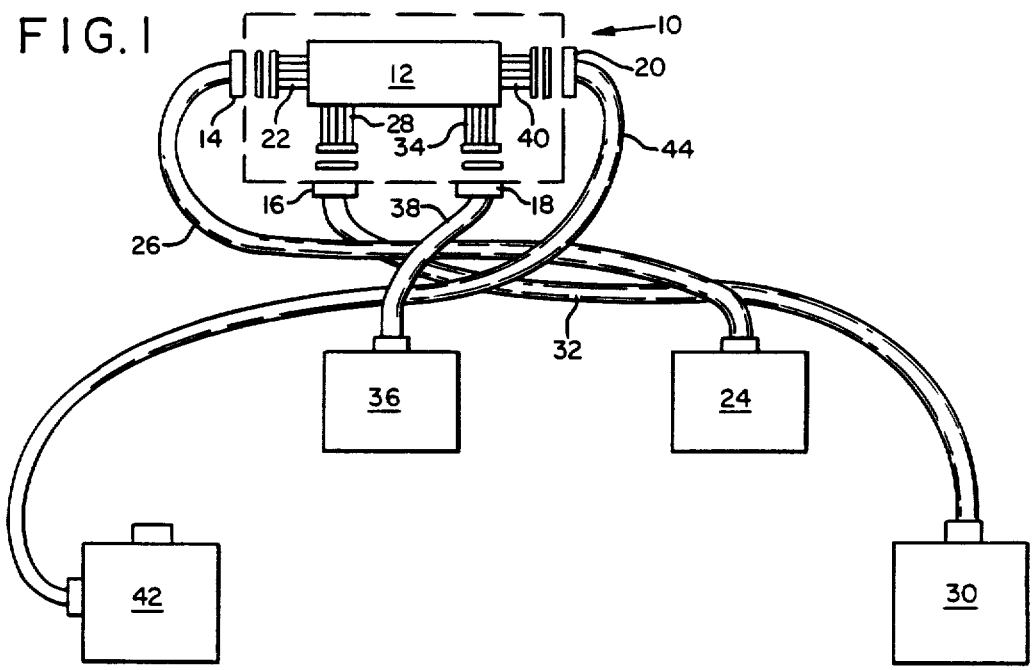
FIG. 1 is a schematic illustration of a work station including a terminal and peripheral units of the prior art.

Referring to the prior art work station of FIG. 1, a terminal 10 includes a central storage unit 12 that receives and stores information to be conveyed to a central processing unit (computer). Interconnected to the storage unit 12 are four receptacles 14, 16, 18, and 20. The circuitry connecting each of the receptacles to the central storage are designed for a specific function. For example, the circuit 22 is designed to accommodate the signals generated by "tablet" 24 which is connected to the receptacle 14 by cable 26. Circuit 28 accommodates a "key board" 30 which is connected to receptacle 16 by cable 32. Circuit 34 accommodates a "key pad" 36 connected to receptacle 18 by cable 38, and circuit 40 accommodates a "joy stick" 42 connected to receptacle 20 through cable 44.

As illustrated, it is assumed that the terminal operator or user is right handed and desires the tablet and key board on the right side of the station, the key pad directly in front, and joy stick to his left. This organization may be dictated by frequency of use, personal preference, size and shape of work station, convenience, or whatever. Another station may of course be completely rearranged. However, in every case, as long as the basic terminal design is maintained, the location of the cable hookups will be the same and it is the interweaving of the cables and the locations of the peripheral units that changes.

Figure 2:
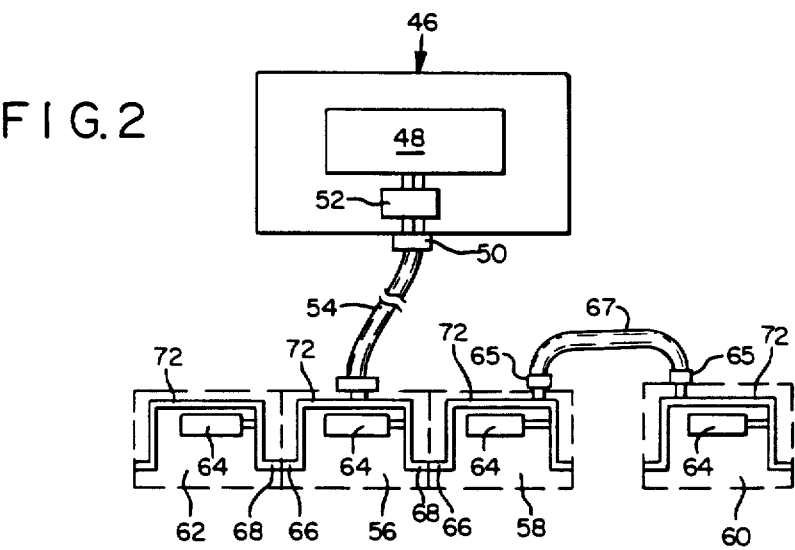
FIG. 2 is a schematic illustration of a work station incorporating the present invention.

FIG. 2 illustrates the arrangement of a work station that is achievable with the present invention. Basically, a computer terminal 46 includes a storage unit 48 that is interconnected to a single receptacle 50 through a micro processor controller 52. A single cable 54 connects the receptacle 50 to a selected primary peripheral unit 56 e.g. the key pad. Other peripheral units (secondary units) having identical receiving and transmitting capability are mechanically and electronically connected to peripheral unit 56 in a manner which will be described hereafter. Each secondary unit connected to the primary unit becomes an extension of the circuitry, and other of the units can be connected to it as illustrated by the interconnection of a fourth peripheral unit 60 (e.g. a tablet) to the secondary unit 58 (e.g. a key board). For comparison purposes, unit 62 is considered to be a joy stick and, as will be noted, the work station of FIG. 2 is organized in a manner similar to FIG. 1 but without the disarray that is inherent with the prior system. The work station of FIG. 2 can be rearranged in any desired manner by interchanging any or all of the peripheral units, and the general neatness and order of the work station will be retained.

THE ELECTRONICS

The microprocessor is conventional except for the manner of its application and interaction with the other components of the system. Micro processors are well known for their capability of translating various forms of electronic communication into basic computer language. The incorporation of such micro processors into the present system accordingly does not require the teaching of special electronic circuitry. It will be sufficient to explain that the micro processor 52 functions as a controller, capable of receiving the input from any of the peripheral units through the micro processor slaves 64 provided for each of the units 56, 58, 60, and 62. Thus each peripheral unit, whether adapted to function through a key board, joy stick, or whatever, conveys the special language of that unit to its micro processor slave 64 which in turn transmits the appropriate signals through cable 54 to the controller 52. The controller 52 is programed to recognize the language it receives from the micro processor slave and sends out the appropriate instructions to the terminal's memory for conveyance to the computer.

Whereas conveyance of the various signals from the peripheral units to a common receptacle is thus made feasible, the manner of converging these signals will now be addressed. In the present embodiment, each of the peripheral units is provided with an internal bus segment 72 (see FIGS. 2, 3, and 4). This internal bus segment 72 functions like an extension of the cable 54. As noted particularly in FIG. 4, there are four external receptacles that communicate with the bus segment 72. Receptacles 65 at the top of the unit are designed for cable connection whereas receptacle 66 and 68, one on each side of the unit, are designed for unit interlock to be described hereafter. A fifth interconnection 70 is provided internally from the micro processor slave 64 to the bus segment 72.

The units 56, 58, and 62 are interlocked, with male receptacle 66 of unit 56 connected with female receptacle 68 of unit 62. Female receptacle 68 of unit 56 is connected with male receptacle 66 of unit 58. Whereas the tablet 60 is generally a larger unit and preferably set apart, this unit is connected by a cable 67 extending between receptacles 65 of the respective units 58 and 60. With cable 54 connected to one of the receptacles 65 of unit 56, it will be appreciated that all of the bus segments 72 of the unit are interconnected with each other and accordingly with cable 54. Each of the micro processor slaves 64 are connected to the respective bus segments and accordingly are connected to the controller 52 as well.

THE MECHANICAL INTERLOCK

The mechanical interlock system is illustrated in FIGS. 3, 4, 5, and 6. A peripheral unit (56, 58, 60, and 62) includes a housing 74 having an interlock mechanism wherein a first half 76 of the mechanism is provided on the right side of the unit which is adapted to engage and interlock with the second half 78 on the left side of a second unit. Each of the units have similar right and left side interlock halves. Thus the left side of any one of the units can be interlocked with the right side of any other of the peripheral units.

The interlock components include fastening lugs 80 of the mechanism 78 that project into openings 82 of the mechanism 76, and stiffening lugs 84 of the mechanism 76 that project into openings 86 of mechanism 78. The fastening lugs 80 each having a pair of vertically spaced apart "C" shaped sections 81 and 83 which are mounted in opposed fasion so that the open sides of the "C" shaped sections face one another. A slide 88 of mechanism 76 carries tongue portions 89 that are slid in and out of locking engagement with the fastening lugs 80 through manipulation of lever 90. The tongue portions 89 are "T" shaped in cross section with the cross bar 85 of the "T" extending vertically. The ends of the cross bar 85 mate with the "C" shaped sections of the lugs 80 to form a stable and secure connection between laterally adjacent peripheral units. The slide 88 is enclosed within the interior of its peripheral unit while the lever 90 extends above the top surface of the unit so as to be accessible by the user for actuating the slide 88. Upon achieving interlock of the units, the male and female receptacles 66 and 68 are interengaged and bus segments 72 of the two units are connected.

A pivotal support 92 is provided on each side of each unit and by turning knob 94 the supports are pivoted between a position flat against the housing, and projected outwardly therefrom (dashed lines of FIG. 5) to elevate the unit for more convenient operation. When the units are interlocked as previously described, the knobs 94 having finger grips 96 are designed to be nested together through the overlapping of the finger grips 96. In the nested condition, the knobs must be turned together with both supports 92 either pivoted down or up. In operation, the intermediate supports 92, having the knobs nested together, will remain in the up or folded position.

Figure 3:
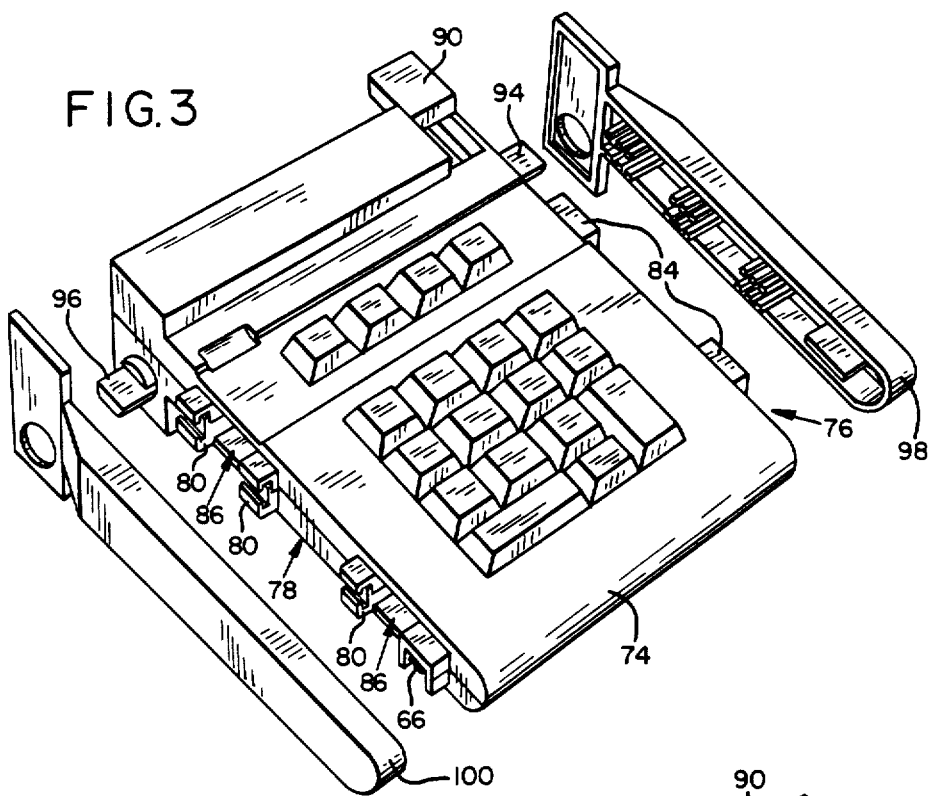
FIG. 3 is an enlarged perspective view of a peripheral unit used in the work station of FIG. 2.
Figure 6:
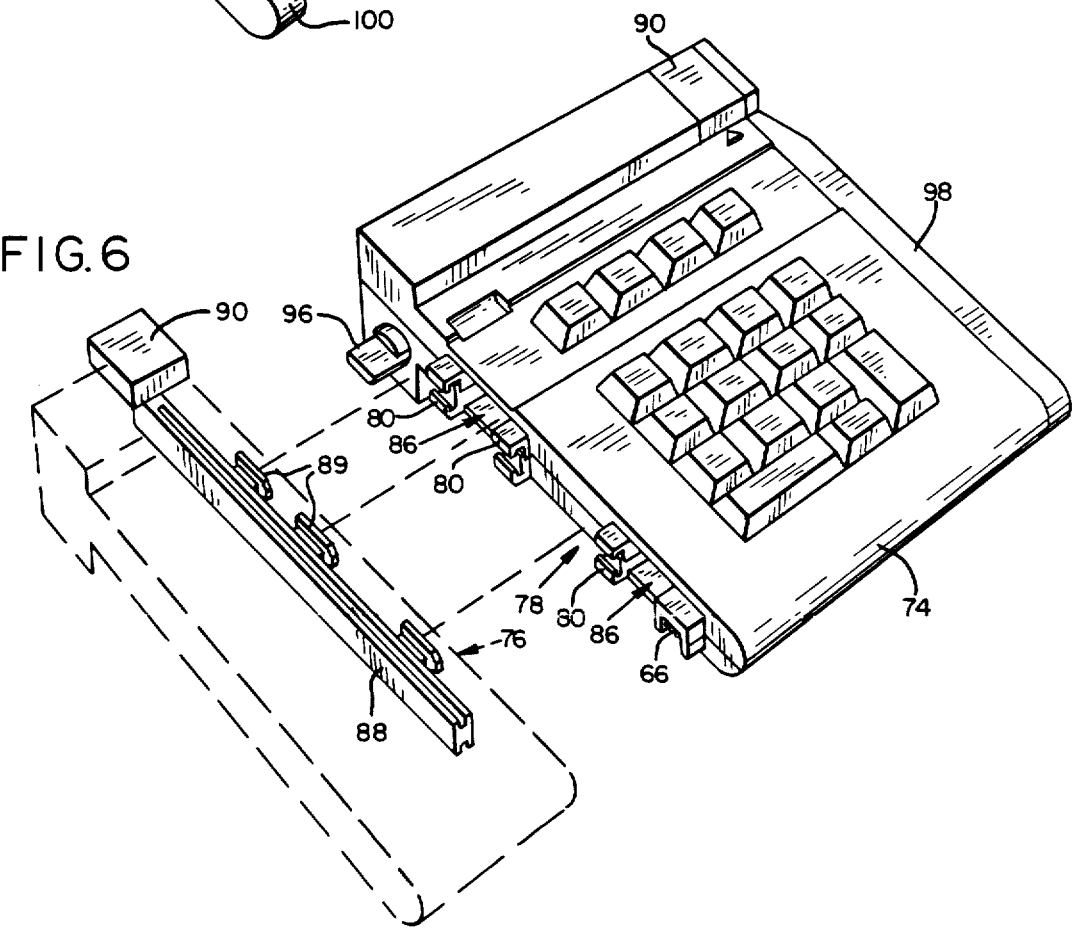
FIG. 6 is a perspective view illustrating the locking mechanism used to interlock the peripheral units.
Figure 5:
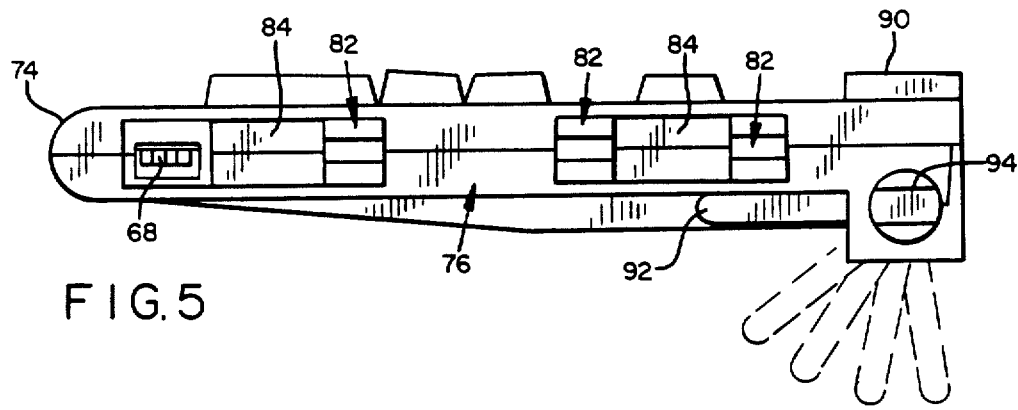
FIG. 5 is a side view of the peripheral unit of FIG. 4.
Figure 4:
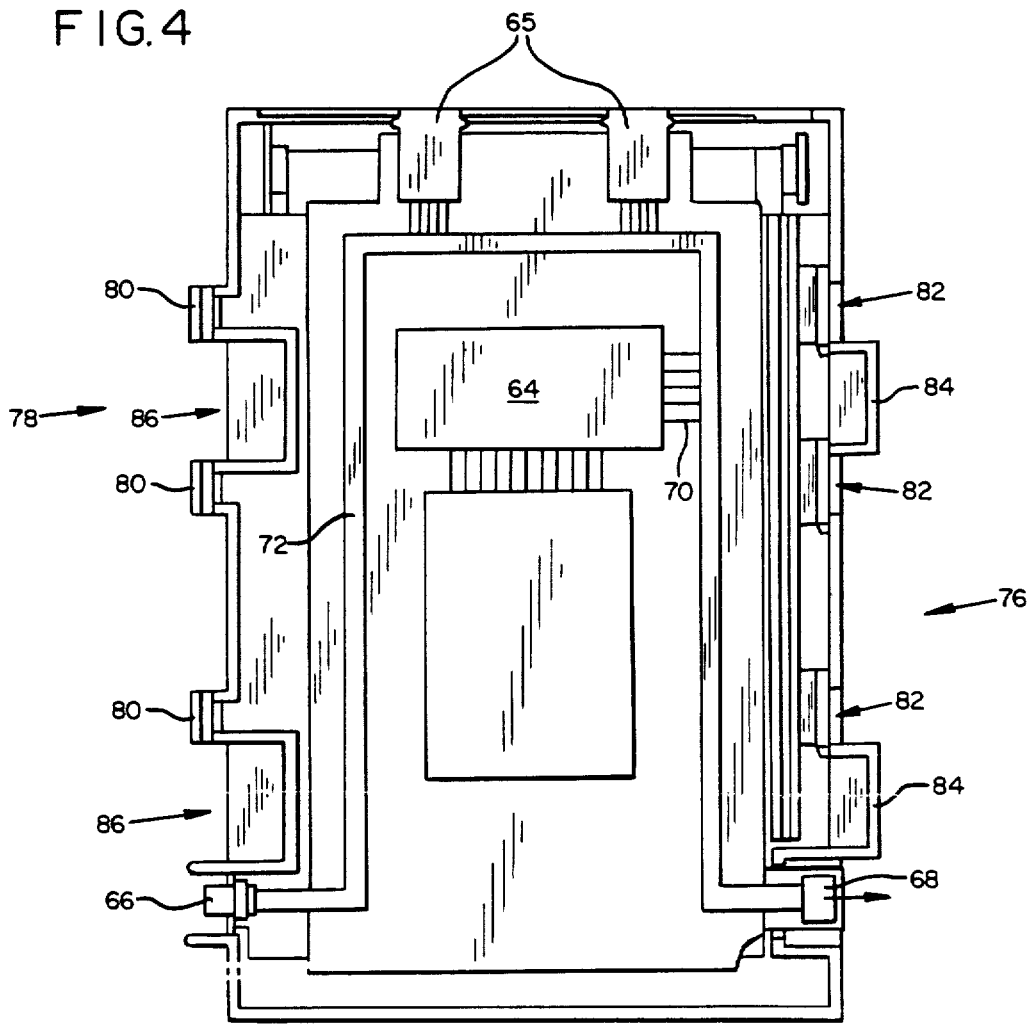
FIG. 4 is a plan view of the peripheral unit of FIG. 3 illustrating, in schematic, the internal components thereof.

As illustrated in FIG. 3, side caps 98 and 100 are designed to cover the exposed interlocking mechanism 76 and 78. These side caps are snap fit into place and easily removable when it is desired to interlock that side to another unit.

SUMMARIZATION OF INVENTION

It will be understood that each different work station and each different operator for the work station requires a customized arrangement of the peripheral units assigned to that station. It is believed preferable that these units, when arranged as desired, be locked together to produce a multi functional unitized panel.

In the preferred embodiment of the invention, micro processors are incorporated into the terminal and into the peripheral units to enable the multiple units to communicate with the terminal through a common receptacle. A common bus is provided that is connected into the common receptacle, and each of the units are connected to the bus. This bus is provided by interconnecting bus segments that are incorporated directly into each of the unit's housing. Thus adding units will extend the bus and achieve interconnection without adding cable.

Whereas multiple units arranged around a station is cumbersome to work with, the ability to lock the units together, as described hereinabove, is considered beneficial. However, the receptacles 65 provided in each of the peripheral units allow cable connection to any of the units should interlock with the unit not be desired e.g. as shown for the tablet 60. This arrangement still permits direct cross over connection from one unit to the other and to the common terminal connection through cable 54.

Other variations will be apparent to those skilled in the art and accordingly the invention is considered to encompass such variations as determined by the appended claims.

I claim:

1. A plurality of peripheral units adapted for electrical and mechanical interconnection, each peripheral unit comprising:
   (a) a housing;
   (b) a set of lugs mounted on one lateral side of said housing, each of said lugs having a pair of vertically spaced apart "C" shaped sections;
   (c) a set of "T" shaped tongue portions secured to a slide mounted on the opposite lateral side of said housing for engaging lugs on an adjacent peripheral unit;
   (d) first and second electrical receptacles mounted on opposite lateral sides of said housing for electrically interconnecting with electrical receptacles of laterally adjacent peripheral units; and
   (e) pivotal support means for adjusting the elevation of the unit and means on opposite ends of said pivotal support means for nesting pivotal support means of adjacent peripheral units together when the units are electrically and mechanically interconnected.

2. A connection system for linking input devices to a computer terminal, comprising:
   (a) two or more computer terminal input devices positionable remote from the computer terminal, each input device being operable by a user for generating an input signal, each input device having a processor mounted thereto for receiving the input signal generated by the input device and for processing that signal into a coded input signal;
   (b) a bus segment mounted to each input device, each bus segment having an end receptacle formed on each end thereof for connecting the bus segment of one input device with the bus segment of another input device, each bus segment of a particular input device being connected to the processor that is mounted to that particular input device so that the connected bus segments receive and conduct therethrough the coded input signals of all the input devices to which the connected bus segments are mounted;
   (c) a cable receptacle attached to each bus segment between the end receptacles thereof; and
   (d) a single calbe interconnected between the computer terminal and one of the cable receptacles for transmitting to the terminal the coded input signals that are conducted through the connected bus segments.

3. The system of claim 2 further including device connect means for connecting two input devices, the device connect means comprising:
   (a) a set of lugs mounted on one side of each input device, each lug having a spaced-apart "C" shaped section; and
   (b) a set of "T" shaped tongue portions slidably mounted on the opposite side of each input device for engaging lugs on adjacent input devices whereby laterally adjacent input devices may be securely connected together.

4. The system of claim 2 wherein each bus segment includes a second cable receptacle attached thereto to permit connection between the bus segments of two input devices that are spaced apart from each other.

5. The system of claim 2 further including a controller connected to the computer terminal and programmed to receive the coded input signals and to control the sequence with which the coded input signals are conducted through the connected bus segments to the controller.

* * * * *